(12) United States Patent
Lin

(10) Patent No.: US 8,025,305 B1
(45) Date of Patent: Sep. 27, 2011

(54) STAND FOR SCOOTERS

(76) Inventor: Henkel Lin, Taichung (TW)

(*) Notice: Subject to any disclaimer, the term of this patent is extended or adjusted under 35 U.S.C. 154(b) by 0 days.

(21) Appl. No.: 12/787,379

(22) Filed: May 25, 2010

(51) Int. Cl.
*B62H 1/02* (2006.01)

(52) U.S. Cl. .................................. 280/301; 280/293

(58) Field of Classification Search .................. 280/301, 280/293, 298, 291
See application file for complete search history.

(56) References Cited

U.S. PATENT DOCUMENTS

| | | | | |
|---|---|---|---|---|
| 3,345,681 A * | 10/1967 | Pletscher | ......................... | 16/291 |
| 3,425,713 A * | 2/1969 | McCauley | ..................... | 280/301 |
| 6,129,370 A * | 10/2000 | Hsieh et al. | ................... | 280/291 |
| 6,170,846 B1 * | 1/2001 | Holter | ........................... | 280/293 |
| 6,648,357 B2 * | 11/2003 | Hotch | ........................... | 280/301 |
| 2002/0084621 A1 * | 7/2002 | Tsai | ............................. | 280/293 |
| 2006/0157625 A1 * | 7/2006 | Griggs | ....................... | 248/188.8 |
| 2006/0214389 A1 * | 9/2006 | Labonte et al. | ............... | 280/293 |
| 2009/0066057 A1 * | 3/2009 | Nakazawa et al. | ............ | 280/301 |
| 2009/0212532 A1 * | 8/2009 | Kudo | ............................ | 280/301 |

* cited by examiner

*Primary Examiner* — Paul N Dickson
*Assistant Examiner* — Tashiana Adams

(57) ABSTRACT

A stand for scooters includes a base laterally mounted to a longitudinal frame under a platform of the scooter. A supporting shaft has a first end pivotally mounted to the base and a second end selectively abutting against a support surface/ground for supporting the scooter. A spring plate has two opposite ends respectively engaged to two opposite ends of the base. The wiggle range of the supporting shaft is 180 degrees and temporarily positioned in each 90 degrees due to a restitution force and a shape of the spring plate.

12 Claims, 6 Drawing Sheets

STAND FOR SCOOTERS

BACKGROUND OF THE INVENTION

1. Field of the Invention

The present invention relates to a stand, and more particularly to a stand for support a scooter after the scooter being used.

2. Description of Related Art

A scooter has been a popular toy for several years. The scooter has only two wheels such as a stand is necessary for supporting the scooter after being used. The conventional stand for the scooter usually uses a spring as a restitution/holding element. However, the spring may hook user's shoestring or bottom of a trouser leg. It is very dangerous and inconvenient during operating the scooter. In addition, the stand has a safety to prevent the stand from being suddenly backward moved. However, the user may fall from the scooter during riding when the downward extending stand abuts against the ground and spoils the balance of the moving scooter.

The present invention has arisen to mitigate and/or obviate the disadvantages of the conventional stand for scooters.

SUMMARY OF THE INVENTION

The main objective of the present invention is to provide an improved stand for scooter, which can be wiggles in two directions.

To achieve the objective, the stand in accordance with the present invention comprises a base adapted to be mounted to a longitudinally frame under a platform of the scooter. The base includes a first through hole centrally defined therein, and a tongue downward extending therefrom and corresponding to the first through hole. A second through hole is laterally defined in the tongue and aligns with the first through hole. A spring plate has two opposite ends respectively engaged to two opposite ends of the base and closing the first through hole. A supporting shaft has a first end pivotally mounted to the base and a second end selectively abutting against a support surface/ground for supporting the scooter. The first end of the supporting shaft is cubic and has a third through hole laterally defined therein. The first end of the supporting shaft has a first side, a second side and a third side perpendicularly corresponding to one another and selectively abutting against the spring plate. A first corner is formed between the first side and the second side of the first end of the supporting shaft, and a second corner is formed between the second side and the third side of the first end of the supporting shaft. The first corner and the second corner alternately press the spring plate via the first through hole when the supporting shaft is wiggled relative to the tongue.

As a result, the wiggle range of the supporting shaft is 180 degrees and temporarily positioned in each 90 degrees due to a restitution force and a shape of the spring plate. Consequently, the friction force will make the supporting shaft backward moved toward the platform to prevent the downward extending supporting shaft from spoiling the balance of the moving scooter when the user forgets to wiggle the supporting shaft before riding the scooter.

Further benefits and advantages of the present invention will become apparent after a careful reading of the detailed description with appropriate reference to the accompanying drawings.

DETAILED DESCRIPTION OF THE INVENTION

Figure 1:
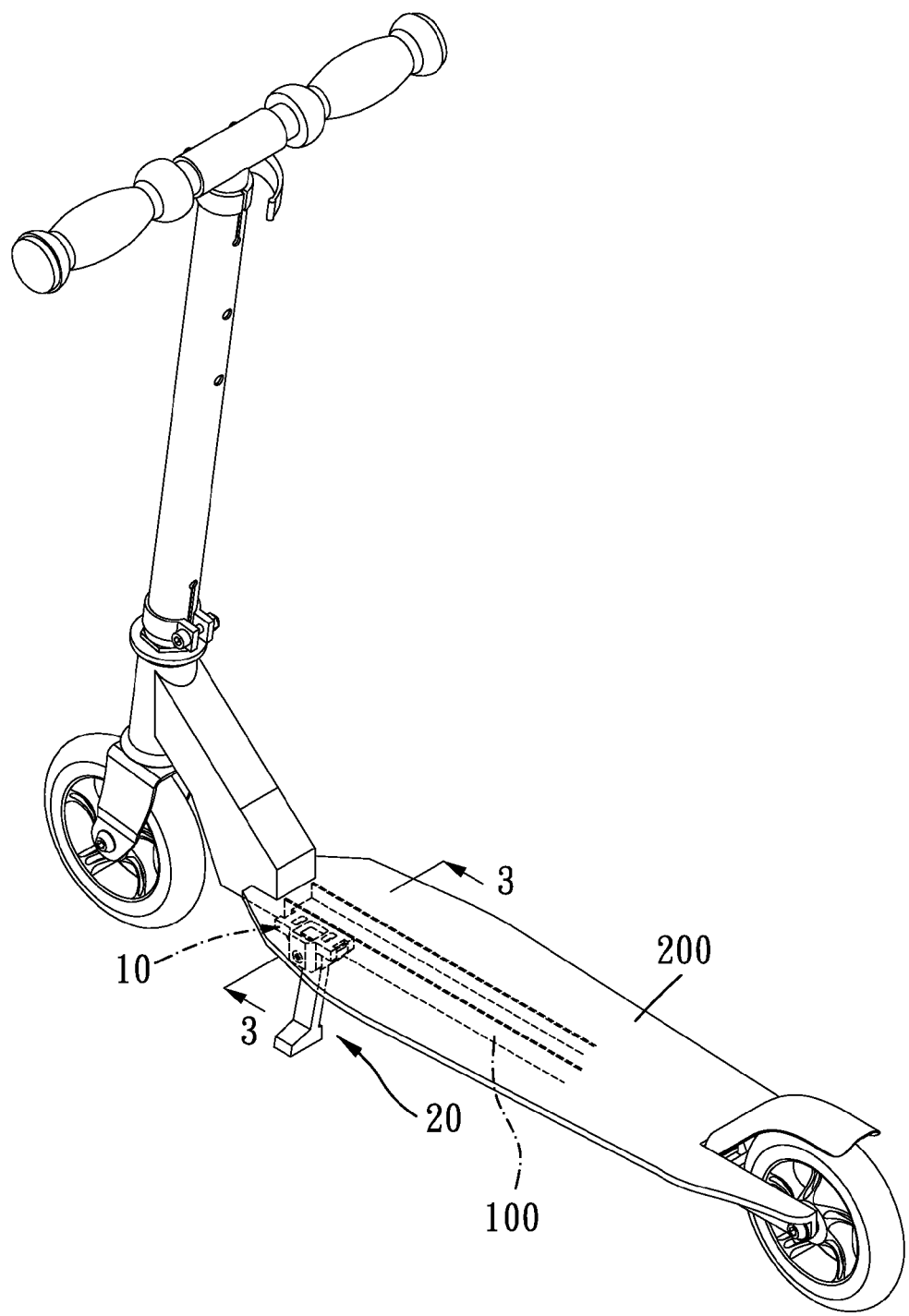
FIG. 1 is a perspective schematic view of a stand for scooters in accordance with the present invention.
Figure 2:
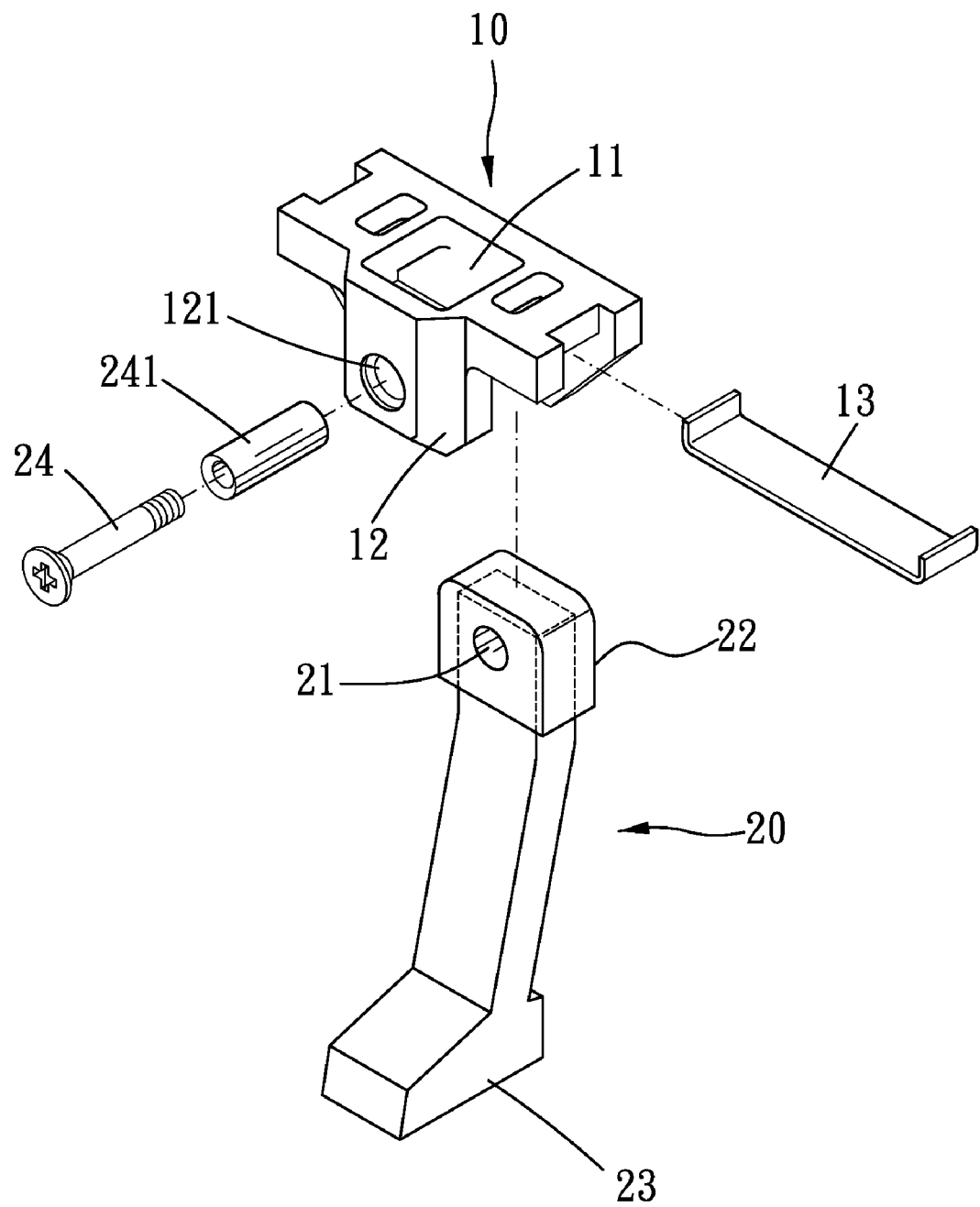
FIG. 2 is an exploded perspective view of the stand for scooters in accordance with the present invention.
Figure 3:
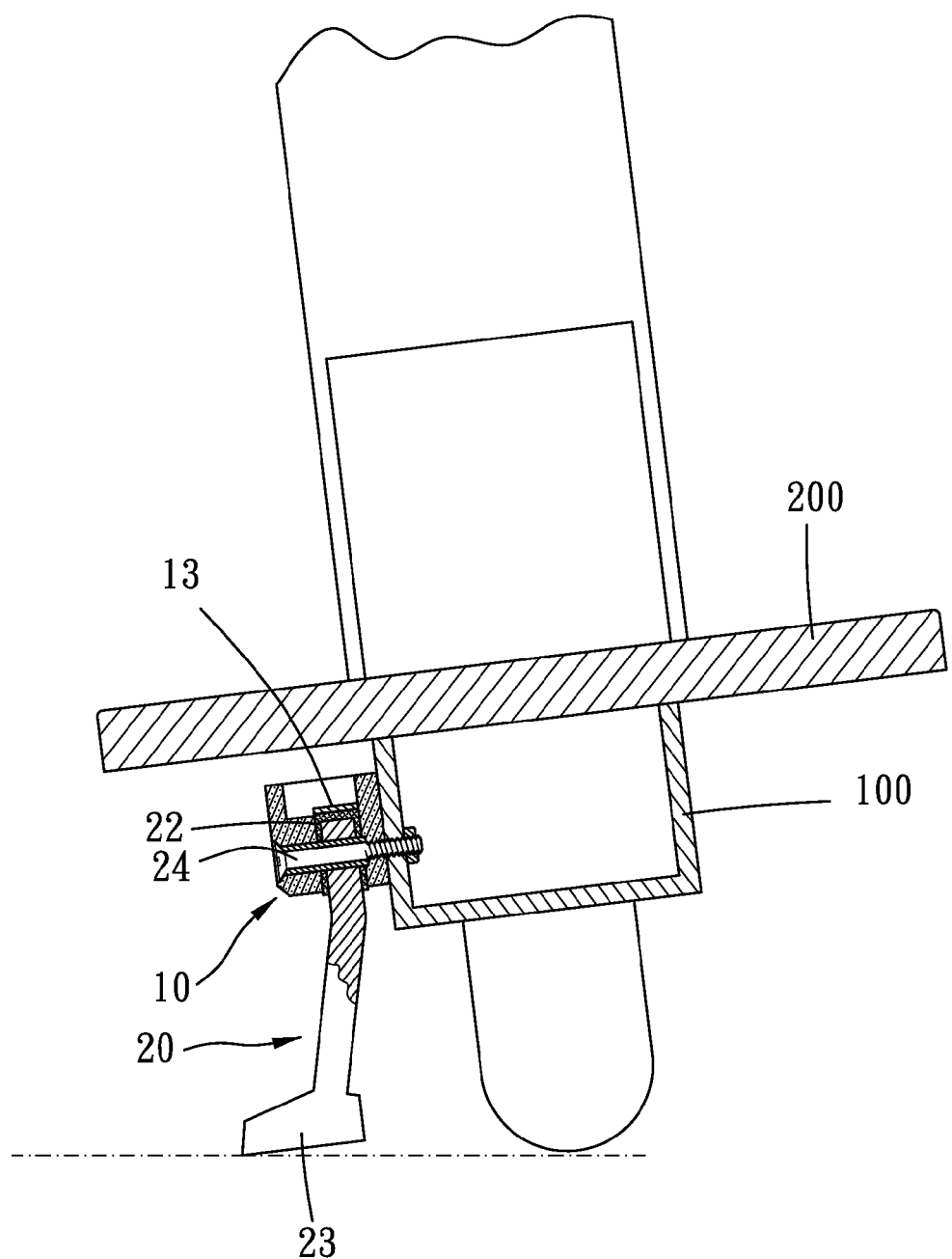
FIG. 3 is a cross-sectional view of a scooter in FIG. 1 along line 3-3 for showing how the stand supporting the scooter.

Referring to the drawings and initially to FIGS. 1-4, a stand for scooters in accordance with the present invention comprises a base (10) laterally mounted to a longitudinal frame (100) under a platform (200) of the scooter. A supporting shaft (20) has a first end pivotally mounted to the base (10) and a second end selectively abutting against a support surface/ground for supporting the scooter.

The base (10) includes a first through hole (11) centrally defined therein, and a tongue (12) downward extending therefrom and corresponding to the first through hole (11). A second through hole (121) is laterally defined in the tongue (12) and aligns with the first through hole (11). A spring plate (13) has two opposite ends respectively engaged to two opposite ends of the base (10) and closing the first through hole (11).

The first end of the supporting shaft (20) is cubic and has a third through hole (21) laterally defined therein. The first end of the supporting shaft (20) has a first side, a second side and a third side perpendicularly corresponding to one another and selectively abutting against the spring plate (13). A first corner is formed between the first side and the second side of the first end of the supporting shaft (20), and a second corner is formed between the second side and the third side of the first end of the supporting shaft (20). The first corner and the second corner alternately press the spring plate (13) via the first through hole (11) when the supporting shaft (20) is wiggled relative to the tongue (12). A wear-resistant cap (22) is sleeved on the first end of the supporting shaft (20) to prevent the spring plate (13) from being quickly worn out. A sole (23) laterally extends from the second end of the supporting shaft (20) for enlarging the contact area between the second end of the supporting shaft (20) and the supporting surface and stably standing the scooter. A locking member (24) sequentially extends through the second through hole (121) and the third through hole (21), and securely engaged to the longitudinal frame (100) of the scooter for mounting the base (10) and the supporting shaft (20) to the scooter. A sheath (241) is sleeved on the locking member (24) to make the supporting shaft (20) more smoothly wiggle relative to the locking member (24).

Figure 4:
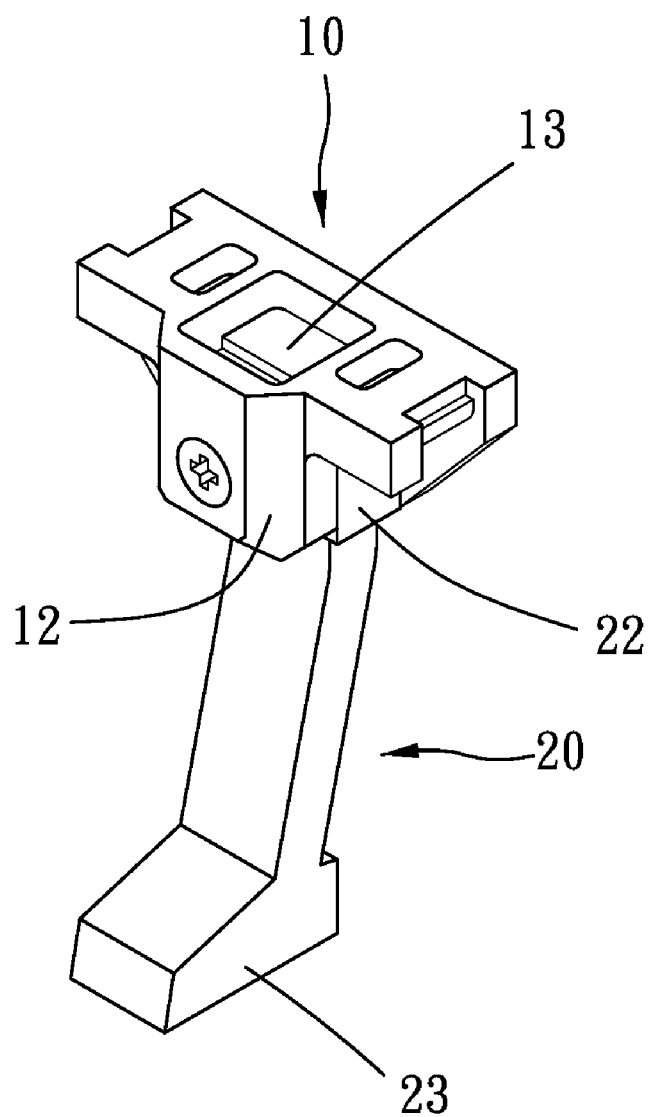
FIG. 4 is a perspective view of the stand of the present invention for supporting a scooter.
Figure 5:
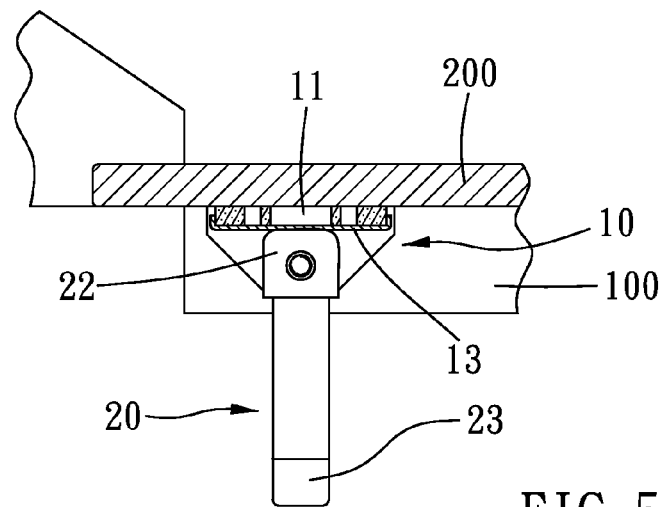
FIGS. 5A to 5C are operational views of the stand in FIG. 4.
Figure 5:
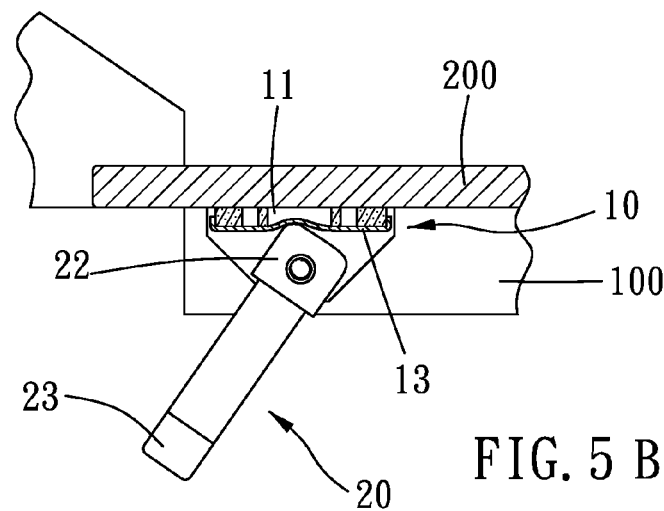
Figure 5:
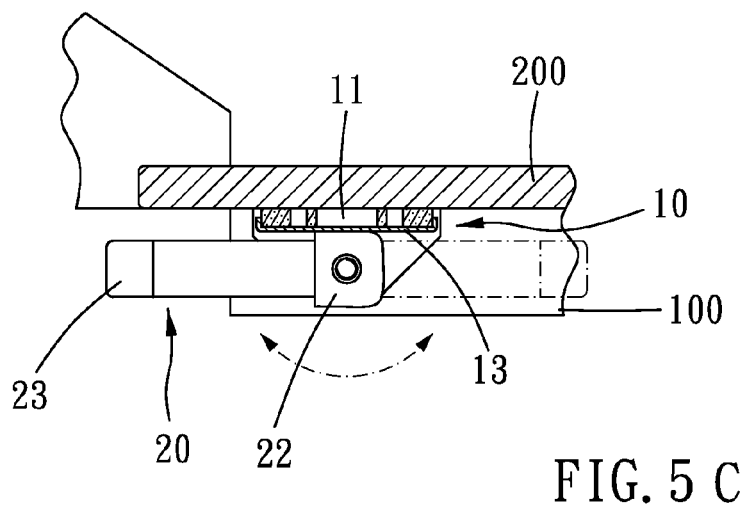
Figure 6:
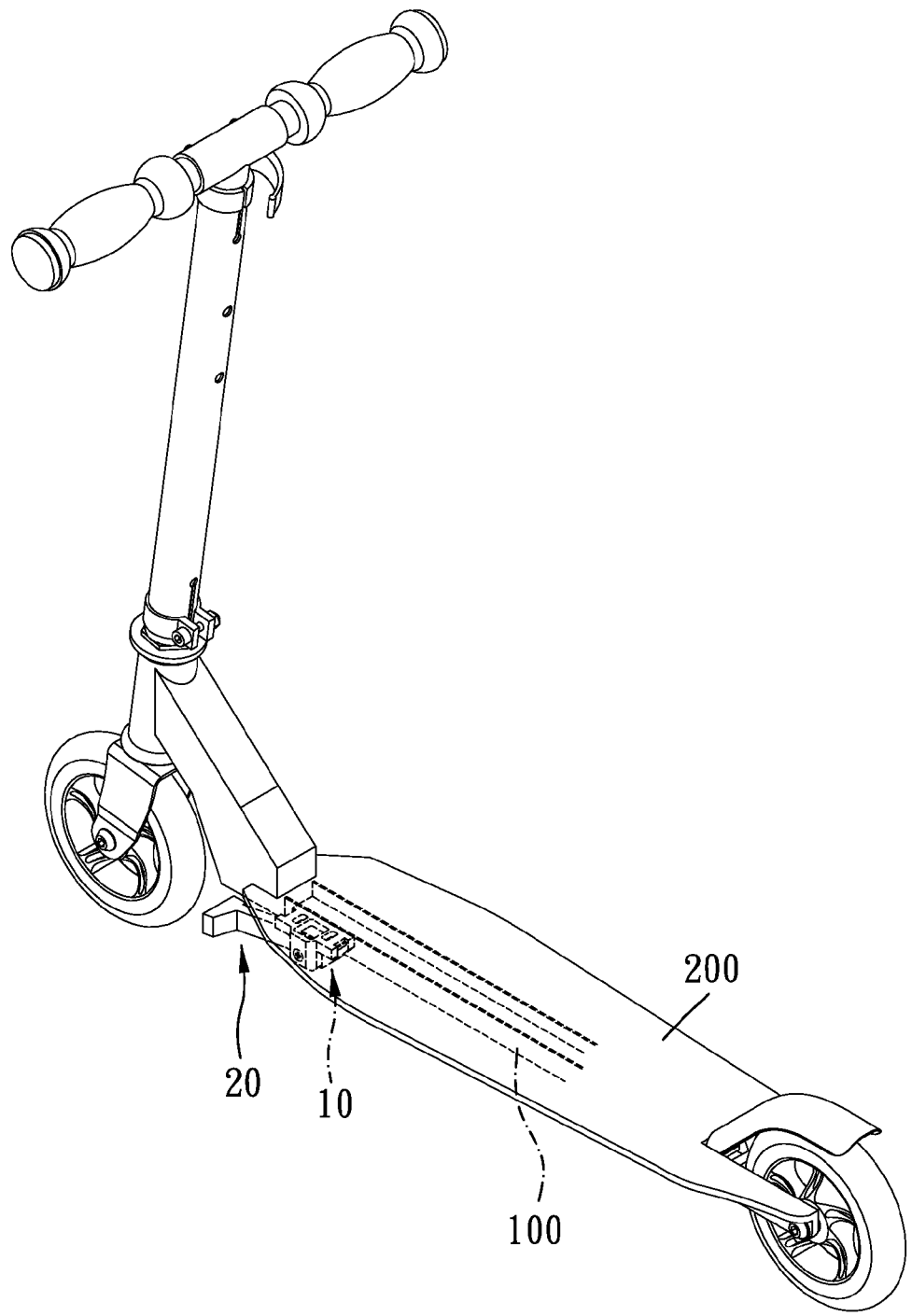
FIG. 6 is another perspective schematic view of a stand for scooters in accordance with the present invention.

With reference to FIGS. 4-6, the wiggle range of the supporting shaft (20) is 180 degrees and temporarily positioned in each 90 degrees due to a restitution force and a shape of the spring plate (13). As shown in FIGS. 4 and 5A, the supporting shaft (20) is perpendicular relative to the platform (200) of the scooter for supporting the scooter and the second side of the first end of the supporting shaft (20) abutting against the spring plate (13). Before riding the scooter, the supporting shaft (20) is wiggled toward a front portion of the scooter to make the supporting shaft (20) being parallel to the platform (200), as shown in FIG. 5 C. In addition, the second end of the supporting shaft (20) extends over the front edge of the platform (200) such that the user can easily wiggle the supporting shaft (20) to the original position after riding. Furthermore, as shown in FIG. 5B, the first corner of the first end of the supporting shaft (20) upwardly presses the spring plate (13) and the restitution force of the spring plate (13) will make the first side of the supporting shaft (20) abutting against the spring plate (13) and holding the supporting shaft (20) in place during riding. On the contrary, the friction force will make the supporting shaft (20) backward moved toward the platform (20) to prevent the downward extending supporting shaft (20) from spoiling the balance of the moving scooter when the user forgets to wiggle the supporting shaft (20) before riding the scooter.

Although the invention has been explained in relation to its preferred embodiment, it is to be understood that many other possible modifications and variations can be made without departing from the spirit and scope of the invention as hereinafter claimed.

What is claimed is:

1. A stand for scooters, comprising:
    a base adapted to be mounted to a longitudinally frame under a platform of the scooter, the base including a first through hole centrally defined therein, and a tongue downward extending therefrom and corresponding to the first through hole, a second through hole laterally defined in the tongue and aligning with the first through hole, a spring plate having two opposite ends respectively engaged to two opposite ends of the base and closing the first through hole; and
    a supporting shaft having a first end pivotally mounted to the base and a second end selectively abutting against a support surface/ground for supporting the scooter, the first end of the supporting shaft being cubic and having a third through hole laterally defined therein, the first end of the supporting shaft having a first side, a second side and a third side perpendicularly corresponding to one another and selectively abutting against the spring plate, a first corner formed between the first side and the second side of the first end of the supporting shaft, and a second corner formed between the second side and the third side of the first end of the supporting shaft, the first corner and the second corner alternately pressing the spring plate via the first through hole when the supporting shaft is wiggled relative to the tongue.

2. The stand for scooters as claimed in claim 1, wherein the supporting shaft includes a wear-resistant cap sleeved on the first end thereof to prevent the spring plate from being quickly worn out.

3. The stand for scooter as claimed in claim 1, wherein the supporting shaft includes a sole laterally extending from the second end of the supporting shaft for enlarging the contact area between the second end of the supporting shaft and the supporting surface and stably standing the scooter.

4. The stand for scooters as claimed in claim 1, wherein the supporting shaft includes a locking member sequentially extending through the second through hole and the third through hole, and securely engaged to the longitudinal frame of the scooter for mounting the base and the supporting shaft to the scooter.

5. The stand for scooter as claimed in claim 2, wherein the supporting shaft includes a sole laterally extending from the second end of the supporting shaft for enlarging the contact area between the second end of the supporting shaft and the supporting surface and stably standing the scooter.

6. The stand for scooters as claimed in claim 2, wherein the supporting shaft includes a locking member sequentially extending through the second through hole and the third through hole, and securely engaged to the longitudinal frame of the scooter for mounting the base and the supporting shaft to the scooter.

7. The stand for scooters as claimed in claim 3, wherein the supporting shaft includes a locking member sequentially extending through the second through hole and the third through hole, and securely engaged to the longitudinal frame of the scooter for mounting the base and the supporting shaft to the scooter.

8. The stand for scooters as claimed in claim 4, wherein the locking member includes a sheath sleeved on the locking member to make the supporting shaft more smoothly wiggle relative to the locking member.

9. The stand for scooters as claimed in claim 5, wherein the supporting shaft includes a locking member sequentially extending through the second through hole and the third through hole, and securely engaged to the longitudinal frame of the scooter for mounting the base and the supporting shaft to the scooter.

10. The stand for scooters as claimed in claim 6, wherein the locking member includes a sheath sleeved on the locking member to make the supporting shaft more smoothly wiggle relative to the locking member.

11. The stand for scooters as claimed in claim 7, wherein the locking member includes a sheath sleeved on the locking member to make the supporting shaft more smoothly wiggle relative to the locking member.

12. The stand for scooters as claimed in claim 9, wherein the locking member includes a sheath sleeved on the locking member to make the supporting shaft more smoothly wiggle relative to the locking member.

* * * * *